(12) United States Patent
Greulich et al.

(10) Patent No.: US 9,730,383 B2
(45) Date of Patent: Aug. 15, 2017

(54) SLIP CONTROLLING BELT TENSION SYSTEM

(71) Applicant: HUSQVARNA AB, Huskvarna (SE)

(72) Inventors: Douglas Greulich, Columbia, SC (US); Matthew Albinger, Shelby, NC (US); Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 5 days.

(21) Appl. No.: 14/772,646

(22) PCT Filed: Mar. 13, 2014

(86) PCT No.: PCT/US2014/025419
§ 371 (c)(1),
(2) Date: Sep. 3, 2015

(87) PCT Pub. No.: WO2014/159895
PCT Pub. Date: Oct. 2, 2014

(65) Prior Publication Data
US 2016/0007526 A1  Jan. 14, 2016

Related U.S. Application Data

(60) Provisional application No. 61/778,724, filed on Mar. 13, 2013.

(51) Int. Cl.
*A01D 41/14* (2006.01)
*A01D 41/127* (2006.01)
(Continued)

(52) U.S. Cl.
CPC ........... *A01D 34/008* (2013.01); *A01D 34/64* (2013.01); *A01D 34/76* (2013.01); *A01D 69/002* (2013.01);
(Continued)

(58) Field of Classification Search
CPC .. F16H 2007/0893; F16H 7/1281; F16H 7/12; F16H 2007/0823; F16H 2007/0891;
(Continued)

(56) References Cited

U.S. PATENT DOCUMENTS 2,632,335 A * 3/1953 Ciaccio ................. F16H 7/1281
474/133
2,960,810 A * 11/1960 Musgrave .......... A01D 34/6812
56/11.3
(Continued)

FOREIGN PATENT DOCUMENTS

GB            2449916 A  * 12/2008  ............... F16H 9/14

OTHER PUBLICATIONS

International Search Report and Written Opinion in the International Application No. PCT/US2014/025419 mailed Jul. 21, 2014.
(Continued)

*Primary Examiner* — Árpád Fábián-Kovács
(74) *Attorney, Agent, or Firm* — McNair Law Firm, P.A.

(57) ABSTRACT

A yard maintenance device having a working assembly selectively rotatable based on operation of an engine of the device may include a belt drive system. The belt drive system may include at least one driven pulley operably coupled to the working assembly, a drive shaft operably coupled to the engine, a drive belt configured to selectively couple the drive shaft to the at least one driven pulley, a tension adjustment assembly, and a control unit. The tension adjustment assembly may be configured to operably couple to at least one component of the belt drive system to adjust a position thereof to modify tension of the drive belt. The control unit may be configured to provide electronic control of the tension adjustment assembly.

20 Claims, 9 Drawing Sheets

(51) Int. Cl.

| | | |
|---|---|---|
| *A01D 46/08* | (2006.01) | |
| *A01D 34/00* | (2006.01) | |
| *A01D 69/08* | (2006.01) | |
| *F16H 7/12* | (2006.01) | |
| *A01D 34/64* | (2006.01) | |
| *A01D 34/76* | (2006.01) | |
| *A01D 69/00* | (2006.01) | |
| *F16H 7/02* | (2006.01) | |
| *F16H 9/10* | (2006.01) | |
| *F16H 7/08* | (2006.01) | |

(52) U.S. Cl.
CPC ............ *A01D 69/08* (2013.01); *F16H 7/02* (2013.01); *F16H 7/08* (2013.01); *F16H 7/1263* (2013.01); *F16H 7/1281* (2013.01); *F16H 9/10* (2013.01); *B60Y 2200/223* (2013.01); *F16H 2007/0823* (2013.01); *F16H 2007/0865* (2013.01); *F16H 2007/0868* (2013.01); *F16H 2007/0876* (2013.01); *F16H 2007/0885* (2013.01); *F16H 2007/0887* (2013.01); *F16H 2007/0893* (2013.01)

(58) Field of Classification Search
CPC .................. F16H 7/1263; F16H 13/14; F16H 2007/0865; F16H 7/02; A01D 34/76; A01D 34/6806; A01D 34/6812; A01D 34/30
USPC .......... 474/135, 117, 133, 110, 118
See application file for complete search history.

(56) References Cited

U.S. PATENT DOCUMENTS

| | | | | |
|---|---|---|---|---|
| 3,570,637 A * | 3/1971 | Pitman | ............... | A01D 34/6812 188/259 |
| 3,709,062 A * | 1/1973 | Draege | ............... | F16H 37/00 474/63 |
| 4,068,452 A * | 1/1978 | Schaefer | ............... | A01D 69/10 192/224.2 |
| 4,102,114 A * | 7/1978 | Estes | ............... | A01D 34/662 56/15.2 |
| 4,195,466 A * | 4/1980 | Heismann | ............... | A01D 34/6812 56/10.5 |
| 4,231,215 A * | 11/1980 | Klas | ............... | A01D 34/30 56/11.6 |
| 4,317,325 A * | 3/1982 | Marto | ............... | A01D 34/6806 56/11.6 |
| 4,557,710 A * | 12/1985 | Greider | ............... | A01D 34/69 474/118 |
| 4,582,504 A * | 4/1986 | Schlapman | ............... | A01D 34/6806 474/119 |
| 4,738,651 A * | 4/1988 | Favache | ............... | F16H 13/14 474/19 |
| 4,813,215 A * | 3/1989 | Chase | ............... | A01D 34/76 56/11.3 |
| 4,925,437 A * | 5/1990 | Suzuki | ............... | F16H 7/1281 474/135 |
| 5,012,632 A * | 5/1991 | Kuhn | ............... | A01D 34/76 474/135 |
| 5,246,403 A * | 9/1993 | Uphaus | ............... | F16H 9/14 474/117 |
| 5,361,566 A * | 11/1994 | Hohnl | ............... | A01D 34/6806 56/11.6 |
| 5,483,787 A * | 1/1996 | Berrios | ............... | A01D 34/661 56/10.1 |
| 5,769,747 A * | 6/1998 | Kuhn | ............... | A01D 34/6806 474/135 |
| 5,797,251 A * | 8/1998 | Busboom | ............... | A01D 34/6812 192/224.1 |
| 6,282,873 B1 * | 9/2001 | Wilken | ............... | F16H 7/0827 474/109 |
| 6,361,457 B1 | 3/2002 | May et al. | | |
| 6,478,701 B1 * | 11/2002 | Yasuhara | ............... | F16H 7/12 305/147 |
| 7,913,479 B2 * | 3/2011 | Eavenson, Sr. | ............... | A01D 34/76 474/135 |
| 8,567,166 B2 * | 10/2013 | Minoura | ............... | A01D 34/76 56/11.6 |
| 2003/0083803 A1 * | 5/2003 | Serkh | ............... | F02B 67/06 701/115 |
| 2005/0192144 A1 | 9/2005 | Yokoyama | | |
| 2008/0264026 A1 | 10/2008 | Ishii et al. | | |
| 2010/0102783 A1 * | 4/2010 | McDonald | ............... | B60W 10/30 322/23 |
| 2010/0131232 A1 | 5/2010 | Taylor | | |
| 2010/0137083 A1 * | 6/2010 | Carlson | ............... | F16H 7/1218 474/110 |
| 2011/0312454 A1 * | 12/2011 | Comsa | ............... | F01L 1/02 474/110 |
| 2013/0047567 A1 | 2/2013 | Minoura et al. | | |
| 2013/0172137 A1 * | 7/2013 | Antchak | ............... | B60K 25/02 474/133 |
| 2015/0057117 A1 * | 2/2015 | Antchak | ............... | F16H 7/1263 474/109 |
| 2015/0257339 A1 * | 9/2015 | Cmich | ............... | A01D 69/08 474/135 |

OTHER PUBLICATIONS

International Preliminary Report on Patentability in the International Application No. PCT/US2014/025419 mailed Sep. 15, 2015.

* cited by examiner

SLIP CONTROLLING BELT TENSION SYSTEM

TECHNICAL FIELD

Example embodiments generally relate to outdoor power equipment and, more particularly, some embodiments relate to a system for controlling slip via belt tension in a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

The cutting blades employed by lawn mowers are typically rotated in some fashion in order to cause the rotating blade to cut vegetation that is encountered thereby. One way to cause rotation of the cutting blade of a lawn mower is to use electricity to engage a clutch to the main engine crankshaft of the lawn mower. One or more drive belts may then selectively couple rotation of the shaft to a drive pulley of one or more blade assemblies. In some cases, such a clutch may be referred to as a power takeoff (PTO) clutch. The PTO clutch may transfer rotational torque and power to activate rotating components like the blades on lawn mowers. For an electrically operated clutch, a magnetic armature and rotor may be operable based on electricity supplied from a battery of the mower to engage a clutch and plate to allow full contact and thereby move a belt to couple rotation of a shaft powered by the engine to rotate the blades. A similar mechanism may also be employed for tillers or other outdoor power equipment that utilizes rotatable working gear to accomplish a task.

In many devices in which a PTO clutch is employed, a switch is provided in an accessible location for the operator to engage or disengage. Based on repeated operation and corresponding repeated mechanical transitions to engage/disengage the clutch and rotate the belt, the belt may wear and/or change in size or other characteristics over time. Mechanical coupling between pulleys using a belt will typically involve some amount of slippage or belt slip that is expected. However, the amount of slip may increase over time and therefore impact operation characteristics. In some cases, changes in the amount of slip may reduce belt life. Accordingly, it may be desirable to provide mechanisms for preventing or mitigating the amount of slip change over time.

BRIEF SUMMARY OF SOME EXAMPLES

Some example embodiments may provide a control system for employment, for example, with a belt drive system of a lawn care device. The belt drive system of some example embodiments may employ a tension adjustment assembly that is configured to adjust a position of an idler pulley within the drive system to adjust belt tension to provide a desired slip. In some cases, the desired slip may be determined based on operating setpoints, but in other cases, the desired slip may be varied or pulsed during a startup operation in order to reduce the impact of sudden engagement during startup.

In an example embodiment, a belt drive system may be provided. The belt drive system may be part of a yard maintenance device having a working assembly selectively rotatable based on engagement or disengagement of a PTO clutch to provide selective coupling between an engine of the device and the working assembly via the belt drive system. The belt drive system may include at least one driven pulley operably coupled to the working assembly, a drive shaft operably coupled to the engine, a drive belt configured to selectively couple the drive shaft to the at least one driven pulley, a tension adjustment assembly, and a control unit. The tension adjustment assembly may be configured to operably couple to at least one component of the belt drive system to adjust a position thereof to modify tension of the drive belt. The control unit may be configured to provide electronic control of the tension adjustment assembly.

In another example embodiment, a lawn care device may be provided. The lawn care device may include a cutting deck housing at least one blade, an engine, and a PTO switch. The engine may be configured to selectively provide for rotation of the at least one blade responsive to selective coupling of the rotary power of the engine to the at least one blade. The PTO switch may be operable to engage or disengage a PTO clutch to provide the selective coupling between the engine and the at least one blade via a belt drive system. The belt drive system may include at least one blade pulley operably coupled to the at least one blade, a drive shaft operably coupled to the engine, a drive belt, a tension adjustment assembly, and a control unit. The drive belt may be configured, responsive to engagement of the PTO clutch, to couple the drive shaft to the at least one blade pulley. The tension adjustment assembly may be configured to operably couple to at least one component of the belt drive system to adjust a position thereof to modify tension of the drive belt. The control unit may be configured to provide electronic control of the tension adjustment assembly.

Some example embodiments may improve the ability of operators to operate outdoor power equipment such as riding lawn mowers or tillers that employ a PTO to engage and disengage a PTO clutch for a belt drive system. Operators may therefore take fuller advantage of the capabilities of their outdoor power equipment devices, and have a greater satisfaction with the performance of their outdoor power equipment devices.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
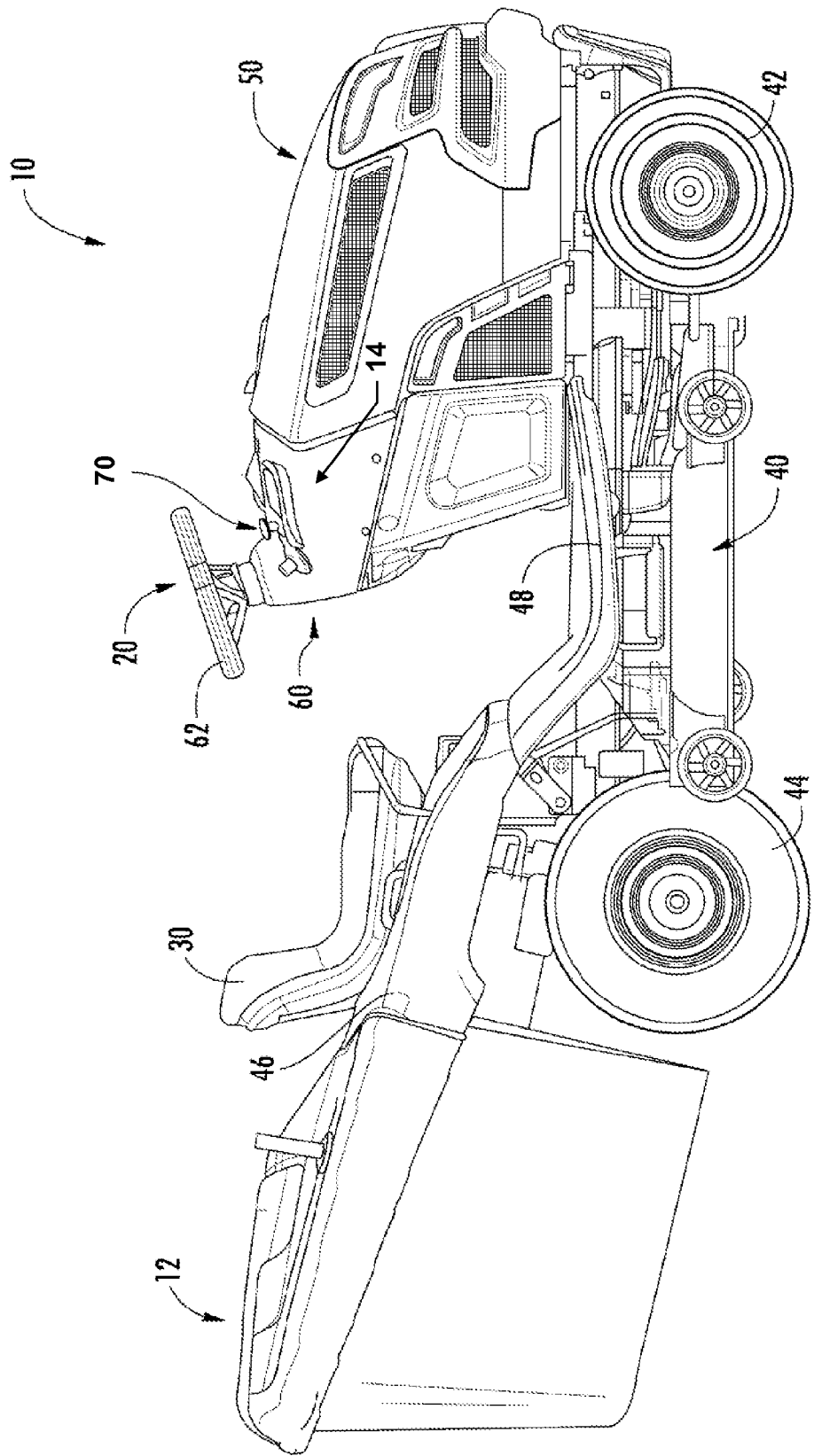
FIG. 1 illustrates a perspective view of the riding lawn care vehicle according to an example embodiment.

Some example embodiments now will be described more fully hereinafter with reference to the accompanying drawings, in which some, but not all, example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf, or sod care. As used herein, operable coupling should be understood to relate to direct or indirect connection that, in either case, enables functional interconnection of components that are operably coupled to each other.

Some conventional riding lawn mowers employ a spring-loaded tensioner to attempt to generate a relatively even amount of belt tension over time. In this regard, the spring-loaded tensioner may be expected to take up slack in the system as the belt begins to stretch initially and then wear over time. However, such a system provides a single and relatively fixed source of tensioning. Example embodiments may provide a source of tensioning that can be used to either increase or decrease belt tension dependent upon the current situation. In this regard, some example embodiments may provide an automatic tensioning device that may be used to adjust (e.g., increasing or decreasing) belt tension dependent upon instructions provided by a control unit, which may be a microcontroller or smart switch assembly. The control unit may adjust tension to maintain a desired slip during operation of the device, or may adjust tension to achieve desirable results that may be specific to certain situations. The operator experience may therefore be improved with respect to operation of riding lawn care vehicles or any other outdoor power equipment on which a PTO clutch with a belt drive system is employed.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays, and/or the like. As shown and described herein, the riding lawn care vehicle 10 may be a riding lawn mower (e.g., a lawn tractor, front-mount riding lawn mower, zero-turn riding lawn mower, cross mower, stand-on riding lawn mower, and/or the like). However, other example embodiments may be employed on other outdoor power equipment devices, such as walk behind lawn mowers, tillers, snow throwers, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters, and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass) via a belt drive system. When the PTO clutch is disengaged, rotary power generated by the engine 50 may not be coupled to the one or more cutting blades and thus the cutting blades may not rotate by virtue of the tension on the belt drive system being released. In some embodiments, engagement of the PTO clutch may be accomplished via operation of a PTO switch 70 that may be disposed on or proximate to the operations panel 14.

It should be appreciated that the cutting deck of this example embodiment houses a working assembly in the form of cutting blades. However, alternative example embodiments may be practiced on other equipment having different working assemblies as well, such as tiller tines, augers, and/or the like. Thus, any working assembly that can be driven via a belt drive system could employ example embodiments.

Figure 2:
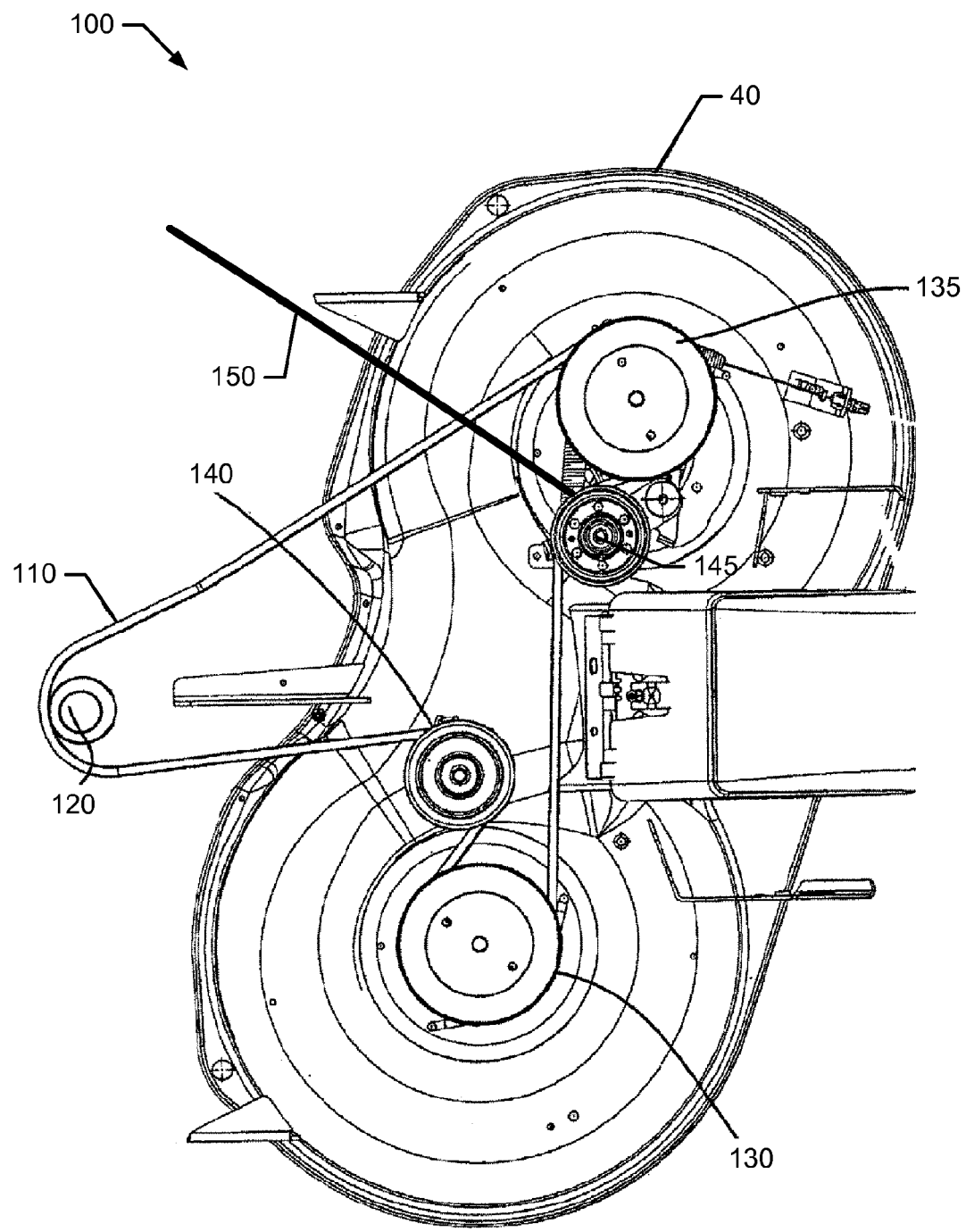
FIG. 2 illustrates a top, isolation view of a cutting deck of the riding lawn care vehicle to illustrate components of a belt drive system of an example embodiment.

FIG. 2 illustrates an isolation view of the top of the cutting deck 40 of an example embodiment to illustrate components of a belt drive system 100. As shown in FIG. 2, a drive belt 110 may selectively operably couple with drive shaft 120, one or more bladepulleys (e.g., first blade pulley 130 and second blade pulley 135), and one or more idler pulleys (e.g., first idler pulley 140 and second idler pulley 145). The initiation of selective coupling of the components above may be accomplished via engagement of the PTO clutch (e.g., responsive to operation of the PTO switch 70). For example, when the PTO clutch is engaged, a position of at least one of the blade pulleys or the idler pulleys may be altered in order to increase tension between the drive belt 110 and the components of the belt drive system 100.

In an example embodiment, the drive shaft 120 may rotate responsive to operation of the engine 50. When the PTO clutch is engaged, the drive belt 110 may have sufficient tension with the drive shaft 120 to move responsive to rotation of the drive shaft 120. The movement of the drive belt 110 may then be translated to the first and second blade pulleys 130 and 135 and to the first and second idler pulleys 140 and 145. In some embodiments, the first and second blade pulleys 130 and 135 may be operably coupled to a shaft to which the blades inside the cutting deck 40 are connected to rotate the blades. The operable coupling between the first and second blade pulleys 130 and 135 and their respective shafts may be accomplished either directly or indirectly. In embodiments where indirect coupling is provided, a gear box may be employed to transfer rotation of a corresponding one of the first and second blade pulleys 130 and 135 to its respective shaft.

In some embodiments, one of the pulleys may be movable responsive to operation of the PTO clutch to engage/disengage the drive belt 110. The belt drive system 100 may also include a tension adjustment assembly (see element 220 of FIG. 3) that may further be operable to adjust tension of the drive belt 110. In some cases, the tension adjustment assembly may operate to move the same pulley that is movable responsive to operation of the PTO clutch. However, it is not necessary for the PTO clutch and the tension adjustment assembly to operate on the same pulley.

In an example embodiment, both the first and second idler pulleys 140 and 145 may be employed to provide for better holding or positioning of the drive belt 110 so that wear and slip characteristics are improved. In some cases, the second idler pulley 145 may be attached to a winch cable 150 that may form a portion of the tension adjustment assembly. In this regard, for example, tension on the winch cable 150 may be increased to pull the second idler pulley 145 in a first direction to either increase or decrease belt tension, and tension on the winch cable may be decreased to allow the second idler pulley 145 to move in a second direction (e.g., opposite the first direction) to either decrease or increase belt tension. In some cases, the second idler pulley 145 may be held by the winch cable 150 against the pressure of a spring or other biasing element so that when tension is relaxed, the biasing element returns the second idler pulley 145 to a prior position along the second direction. The winch cable 150 may be operated by an electric motor of the tension adjustment assembly as discussed in greater detail below. It should be noted that although only a single movable idler pulley is mentioned in the example above, some example embodiments may employ multiple moving or clutching idler pulleys.

Figure 3:
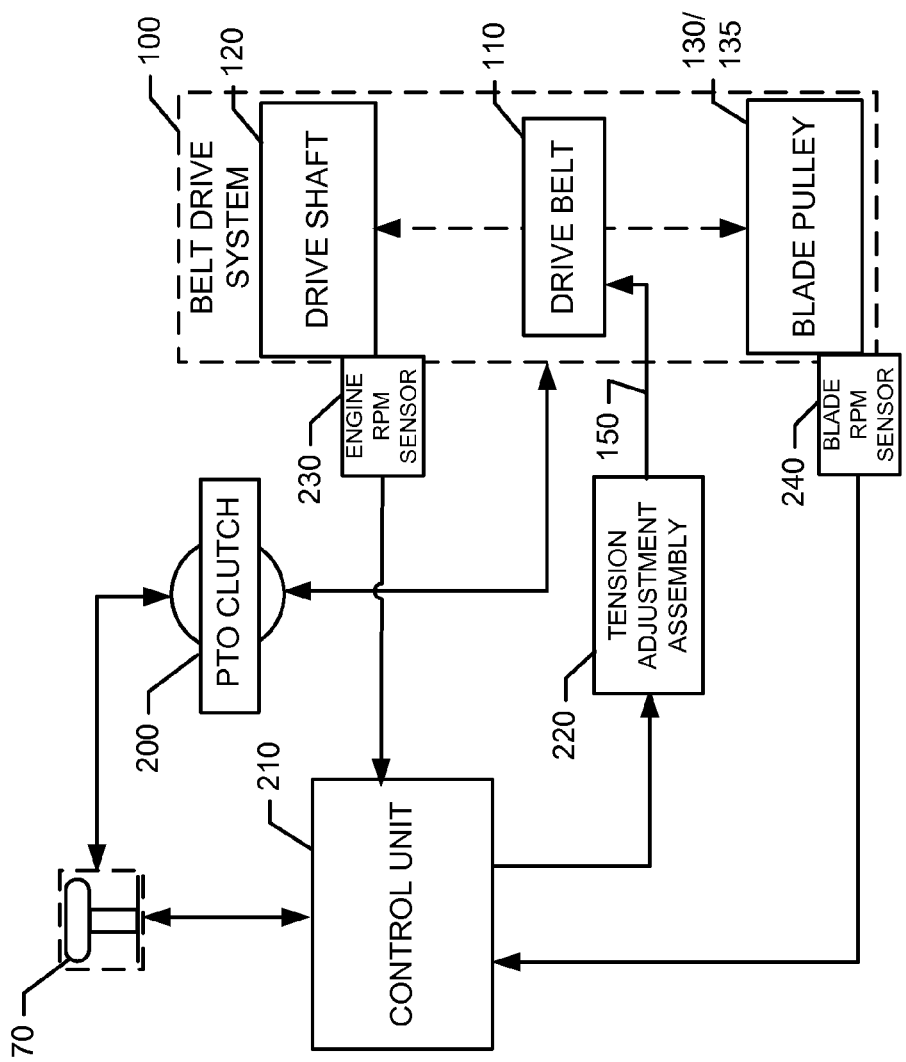
FIG. 3 illustrates a functional block diagram for explaining operation of the belt drive system of an example embodiment

FIG. 3 illustrates a functional block diagram for explaining the operation of the belt drive system 100 of an example embodiment. As shown in FIG. 3, the PTO switch 70 may be operable to engage or disengage a PTO clutch 200. The PTO clutch 200 may be an electric clutch or a conventional clutch. An indication of a position of the PTO switch 70 (e.g., an electrical signal indicative of PTO switch 70 status) may also be provided to a control unit 210 of an example embodiment. The control unit 210 may be configured to make control decisions regarding at least the adjustment of belt tension for the belt drive system 100 by providing control inputs to a tension adjustment assembly 220.

Both the PTO clutch 200 and the tension adjustment assembly 220 may provide inputs to the belt drive system 100 to control tension of the drive belt 110. As described above, the drive shaft 120 may couple to the first and second blade pulleys 130 and 135 via the belt drive system 100. The tension adjustment assembly 220 may be configured to further receive inputs indicative of engine RPM and blade RPM via corresponding sensors (e.g., engine RPM sensor 230 and blade RPM sensor 240). The control unit 210 may be configured to reference inputs indicative of engine RPM and blade RPM in addition to PTO switch status (or PTO clutch status) in order to determine how to control the tension adjustment assembly 220.

In some embodiments, the RPM sensors (e.g., the engine RPM sensor 230 and the blade RPM sensor 240) may utilize optical sensors to detect the rate of appearance of a particular optical feature during rotation of the drive shaft 120 or one or both of the first and second blade pulleys 130 and 135. In an example embodiment, the first and second blade pulleys 130 and 135 may include drain holes formed in a surface thereof, so that any fluid gathering on top of the pulleys may drain through the drain holes. An optical sensor or Hall effect sensor may be positioned to count rotations of the pulleys based on detection of the drain holes. Other RPM detection mechanisms may be employed in some alternative embodiments.

Figure 4:
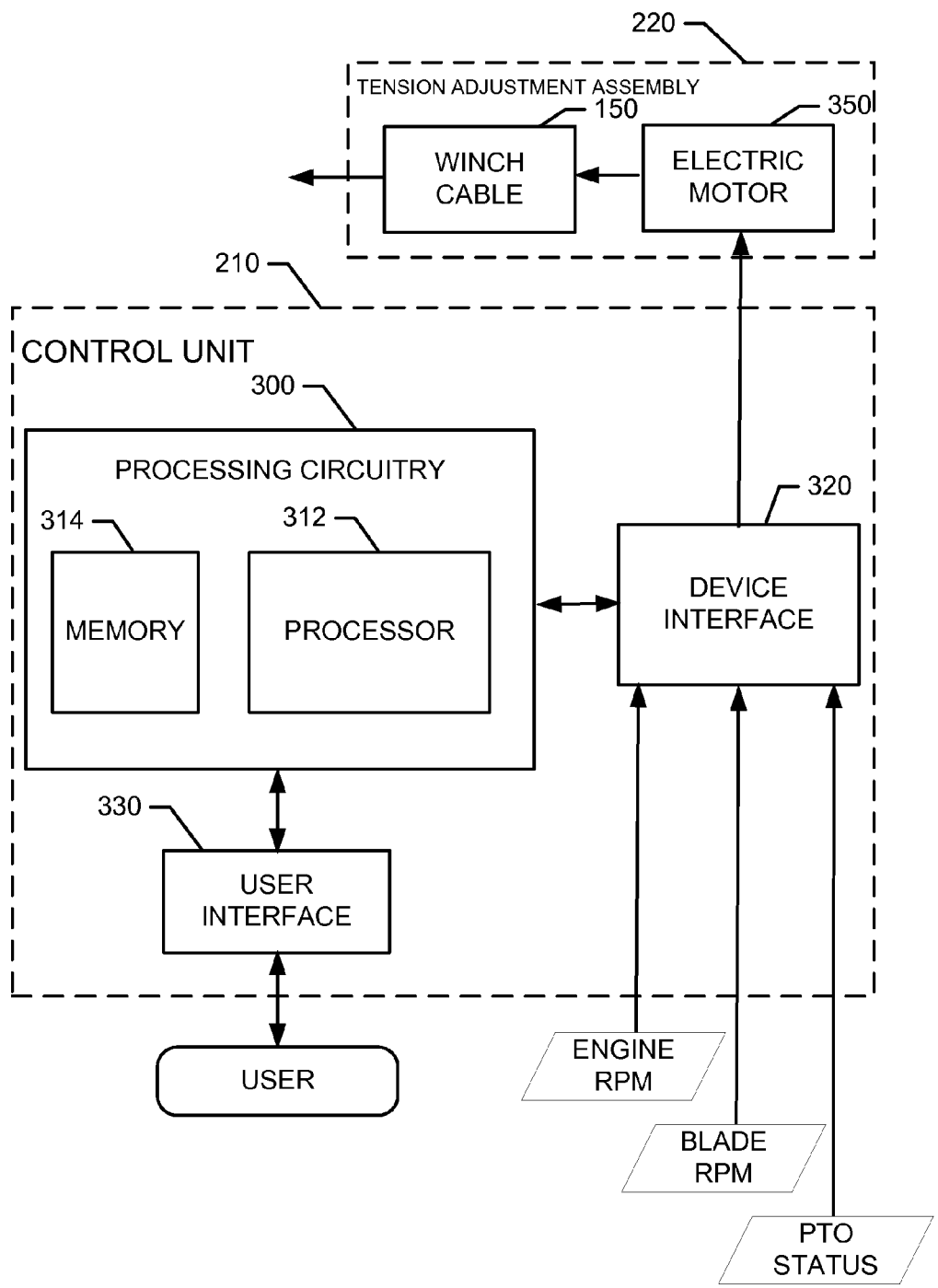
FIG. 4 illustrates a functional block diagram of processing circuitry of a control unit of an example embodiment.

FIG. 4 illustrates a functional block diagram of the control unit 210 of an example embodiment. In this example, the control unit 210 may be provided in the context of a control system of the riding lawn care vehicle 10. However, it should be appreciated that the control unit 210 could alternatively be provided in the context of control systems for other outdoor power equipment. As shown in FIG. 4, the control unit 210 may utilize the processing circuitry 300 to provide electronic control inputs to the tension adjustment assembly 220 of the riding lawn care vehicle 10 based on processing of engine RPM, blade RPM, and PTO status. The processing circuitry 300 may be configured to perform data processing, control function execution, and/or other processing and management services according to an example embodiment of the present invention. In some embodiments, the processing circuitry 300 may be embodied as a chip or chip set. In other words, the processing circuitry 300 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The processing circuitry 300 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 300 may include one or more instances of a processor 312 and memory 314 that may be in communication with or otherwise control a device interface 320 and, in some cases, a user interface 330. As such, the processing circuitry 300 may be embodied as a circuit chip (e.g., an integrated circuit chip) configured (e.g., with hardware, software, or a combination of hardware and software) to perform operations described herein. However, in some embodiments, the processing circuitry 300 may be embodied as a portion of an on-board computer. In some embodiments, the processing circuitry 300 may communicate with electronic components and/or sensors (e.g., of the engine RPM sensor 230 and the blade RPM sensor 240) of the riding lawn care vehicle 10.

The user interface 330 (if implemented) may be in communication with the processing circuitry 300 to receive an indication of a user input at the user interface 330 and/or to provide an audible, visual, mechanical, or other output to the user. As such, the user interface 330 may include, for example, a display, one or more levers, switches, buttons or keys (e.g., function buttons), and/or other input/output mechanisms of the operations panel 14. In an example embodiment, the PTO switch 70 may be one example of a component that may form a part of the user interface 330.

The device interface 320 may include one or more interface mechanisms for enabling communication with other devices (e.g., sensors and/or other accessories or functional units such as motors, engines, servos, switches, or other operational control devices for providing control functions). In some cases, the device interface 320 may be any means such as a device or circuitry embodied in either hardware or a combination of hardware and software that is configured to receive and/or transmit data from/to sensors in communication with the processing circuitry 300.

The processor 312 may be embodied in a number of different ways. For example, the processor 312 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 300) capable of performing operations according to embodiments of the present invention while configured accordingly. Thus, for example, when the processor 312 is embodied as an ASIC, FPGA, or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 300) may be embodied as, include, or otherwise control the operation of the control unit 210 based on inputs received by the processing circuitry 300 responsive to positioning of the PTO switch 70 and inputs received from the engine RPM sensor 230 and the blade RPM sensor 240 and, in some embodiments, other components. As such, in some embodiments, the processor 312 (or the processing circuitry 300) may be said to cause each of the operations described in connection with the control unit 210 in relation to operation of the tension adjustment assembly 220 to undertake the corresponding functionalities responsive to execution of instructions or algorithms configuring the processor 312 (or processing circuitry 300) accordingly. In particular, the instructions may include instructions for operation of an electric motor 350 that may be configured to increase or decrease tension on the winch cable 150 to adjust drive belt 110 tension as described above.

In an exemplary embodiment, the memory 314 may include one or more non-transitory memory devices such as, for example, volatile and/or non-volatile memory that may be either fixed or removable. The memory 314 may be configured to store information, data, applications, instructions, or the like for enabling the processing circuitry 300 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input from at least the PTO switch 70, the engine RPM sensor 230, and the blade RPM sensor 240. The data sets may define slip ratio setpoints (e.g., a ratio of engine RPM and blade RPM) that are desirable for various load conditions and/or various operational status conditions. Among the contents of the memory 314, applications and/or instructions may be stored for execution by the processor 312 in order to carry out the functionality associated with each respective application/instruction. In some cases, the applications may include instructions for providing inputs to control operation of the electric motor 350 to adjust drive belt 110 tension as described herein.

In some embodiments, the control unit 210 may be configured to adjust drive belt 110 tension to achieve desirable slip values for current operating conditions. In an example embodiment, when the engine 50 is running normally and the blades are engaged, a normal operating slip setpoint may be provided and the control unit 210 may adjust tension of the drive belt 110 to achieve the normal operating slip. For example, if blade RPM is too low for a given engine RPM, the drive belt 110 tension may be increased. Meanwhile, if blade RPM is too high for a given engine RPM, the tension of the drive belt 110 may be decreased. As indicated above, adjustment of the tension of the drive belt 110 may be accomplished by operating the electric motor 350 to move the winch cable 150 in the desired direction.

In some embodiments, the winch cable 150 and electric motor 350 may be operated to provide adjustment of the tension of the drive belt 110 during startup or other non-steady state operating conditions. In this regard, conventional systems may experience a relatively large shock due to rapid increase in tension between the drive belt 110 and the drive shaft 120 when the transmission is engaged. However, example embodiments may employ the control unit 210 to more gradually increase tension between the drive belt 110 and components of the belt drive system 100. In some examples, the control unit 210 may be configured to determine a startup condition and execute a "soft start" to gradually increase tension of the drive belt 110.

A soft start may be executed in a number of different ways. In some cases, the soft start may be executed by virtue of a slow increase in tension of the drive belt 110. In such an example, the electric motor 350 may increase tension on the winch cable 150 to move the second idler pulley 145 to a predetermined position that is a percentage (e.g., about 90%) of the normal operating tension setpoint. The remaining ten percent of tension increase may be accomplished relatively slowly over a period of time. In some cases, the rate of increase in tension may be dependent upon initial conditions (e.g., ambient temperature, time since last engine start, etc.). As an alternative to a gradual or timed increase to normal operating tension, some embodiments may employ a pulsed application of increased belt tension. Other mechanisms for avoiding a single rapid increase in tension may also be employed.

In an example embodiment, the control unit 210 may be configured to monitor PTO switch 70 position to determine whether, how, and in some cases also when to perform tension adjustment. In some embodiments, a timer may be employed to determine a period of time after activation of the PTO switch 70 during which gradual or pulsed tension increase is to be applied. Belt tension adjustment may also, in some cases, be accomplished to achieve a release of tension in a controlled manner when the PTO clutch is disengaged.

The control unit 210 may access and execute instructions for control of the tension adjustment assembly 220 and operate to achieve tension setpoints for current operating conditions within a predetermined amount. The control unit 210 may determine belt tension on the basis of the slip of the drive belt 110. The slip may be determinable based on a comparison of engine RPM to blade RPM. In some cases, factory testing may be accomplished to determine slip values during normal operation. The ratio between engine RPM and blade RPM may be indicative of slip and may be recorded as a setpoint value. The control unit 210 may thereafter monitor blade RPM and engine RPM and adjust tension of the drive belt 110 via operation of the tension adjustment assembly 220 to achieve the setpoint value at least within a predetermined amount or percentage. For example, in some cases, the control unit 220 may monitor engine RPM and blade RPM to determine a current slip based on the ratio between engine RPM and blade RPM. If the current slip is not within 5% of the setpoint value of slip for the current operating conditions, the control unit 210 may adjust tension of the drive belt 110 to provide slip within 5% of the setpoint value.

Figure 5:
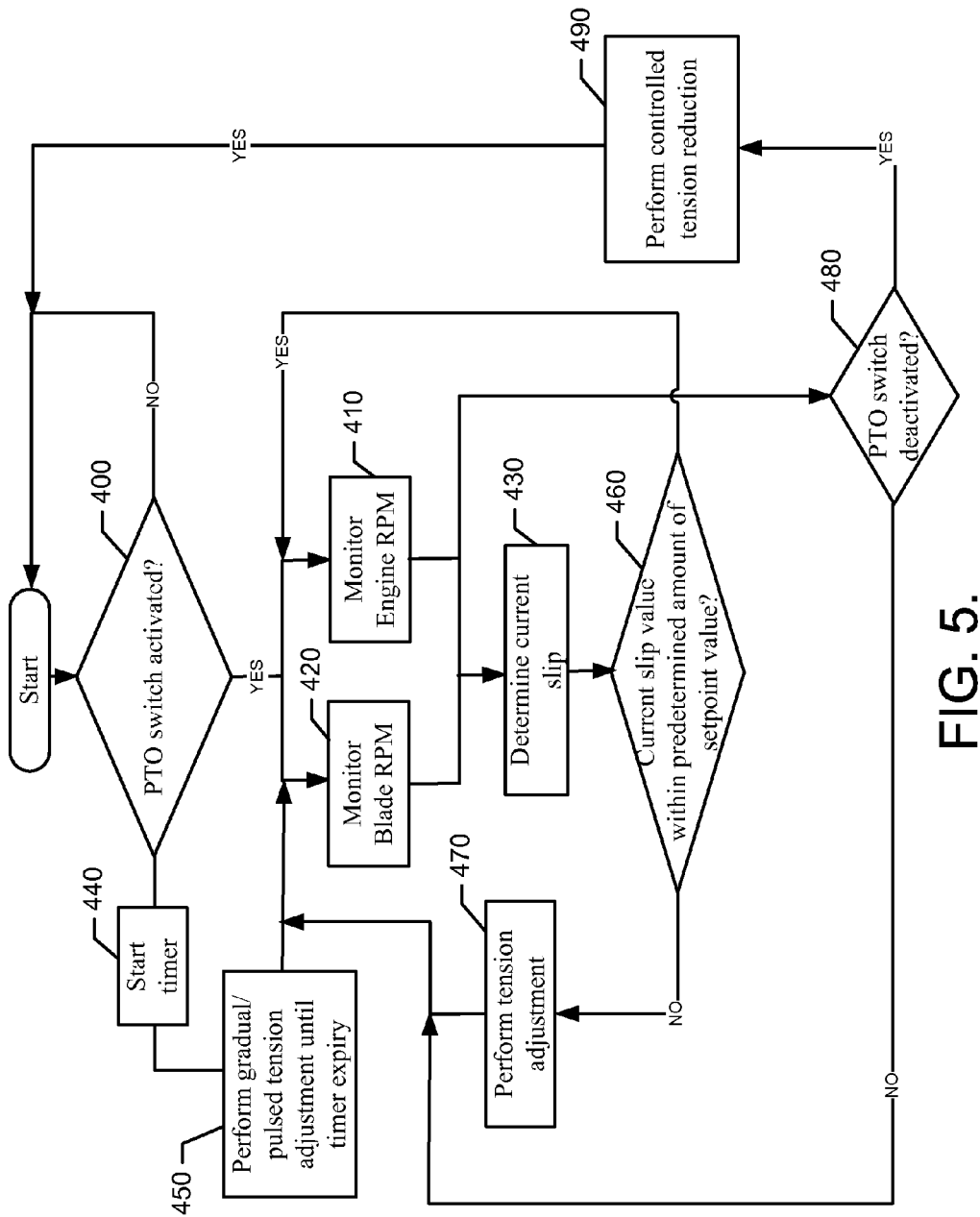
FIG. 5 illustrates a block diagram of a method of controlling belt tension of a lawn care device via a belt drive system according to an example embodiment.

In an example embodiment, a method of controlling belt tension of a lawn care device having a cutting deck that houses at least one blade and an engine configured to selectively provide for rotation of the at least one blade responsive to selective coupling of rotary power of the engine to the at least one blade via a belt drive system may be provided. FIG. 5 illustrates a block diagram of such a method. The method may include detecting PTO switch position (i.e., whether the PTO switch is activated/engaged or deactivated/disengaged) at operation 400. If the PTO switch is disengaged, operation may return to start and monitoring for a change in status of the PTO switch position may be continued. If the PTO switch is engaged, engine RPM may be monitored at operation 410 and blade RPM may be monitored at operation 420. Engine RPM and blade RPM may be compared to determine current slip at operation 430. In some cases, a timer may also be started at operation 440 in response to activation of the PTO switch to determine a period of time after PTO switch activation. Gradual or pulsed tension increase may be applied using the tension adjustment assembly at operation 450 prior to expiry of the timer or during the timer run. After timer expiry or a predetermined period of time after activation of the PTO switch, the current slip value may be compared to a slip value setpoint at operation 460. If the current slip value is within a predetermined amount (e.g., 5%) of the setpoint value, monitoring of blade RPM and engine RPM at operations 410 and 420 may continue. If the current slip value is not within the predetermined amount of the setpoint value, tension adjustment may be accomplished at operation 470 and control flow may return to operations 410 and 420. In parallel with operations 410 and 420 (or subsequent thereto), PTO switch position may continue to be monitored to determine whether the PTO switch is deactivated at operation 480. If deactivation is detected, controlled tension reduction may occur at operation 490 and control flow may be reset, returning to start. If there is no deactivation detected, then monitoring of blade RPM and engine RPM at operations 410 and 420 may continue.

Figure 6:
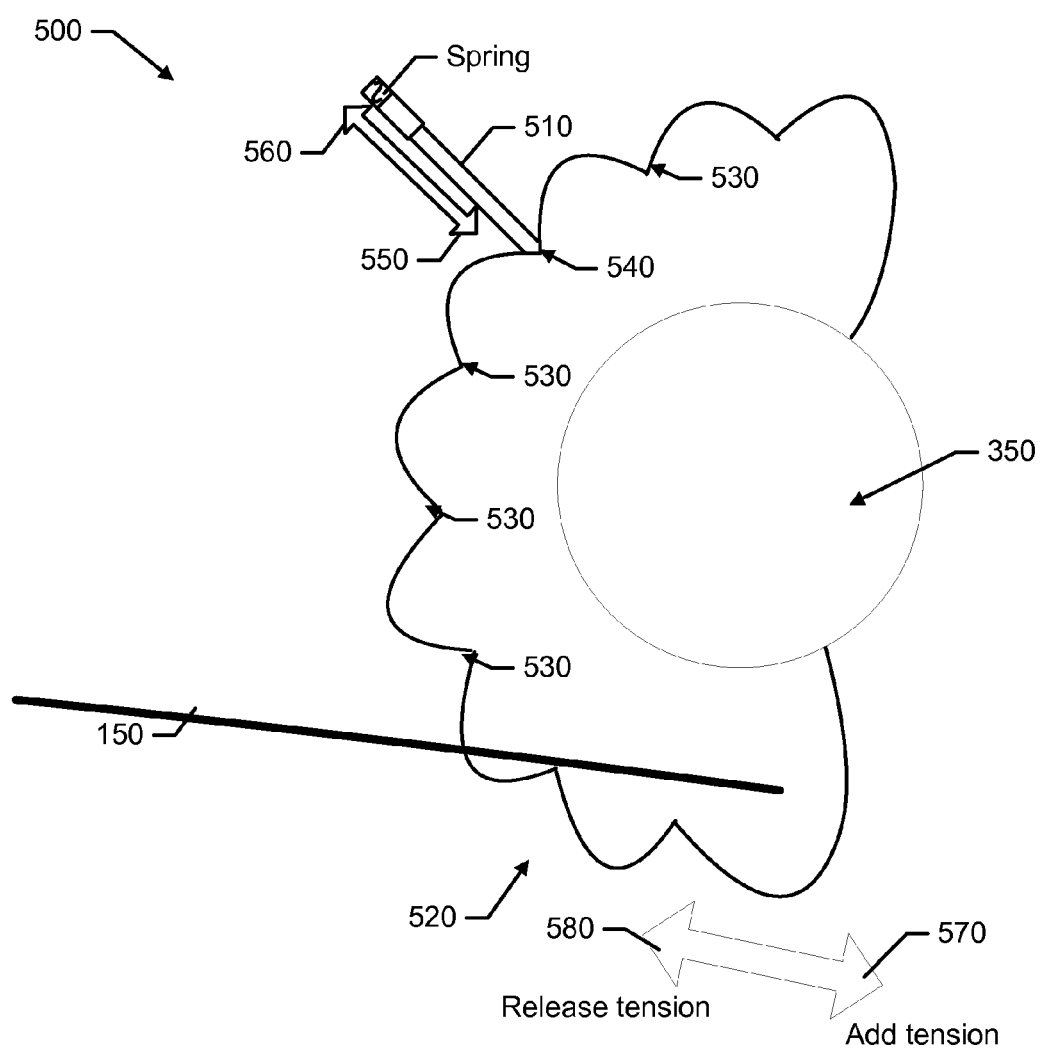
FIG. 6 illustrates a block diagram of a tension holder according to an example embodiment.

The electric motor 350 may, in some embodiments, also operate an electrical PTO clutch. Thus, for example, the electric motor 350 and/or the winch cable 150 may be used in the context of normal operation of the PTO clutch. However, in such an example, the electric motor 350 and the winch cable 150 may be further operable to make relatively minor tension adjustments to achieve consistent belt tension over the life of the drive belt 110. The electric motor 350 may be embodied in any suitable manner. However, in some embodiments, the electric motor 350 may be embodied as a linear actuator or a DC motor (e.g., a brushless DC motor). In some embodiments, the electric motor 350 may operate to adjust a mechanical structure to hold tension at a desired amount (e.g., by providing a particular amount of tension on the winch cable 150). FIG. 6 illustrates an example of such a tension holder 500.

As shown in FIG. 6, the tension holder 500 may include a solenoid 510 operated stem that is biased, responsive to activation of the solenoid 510, toward contact with a rotating mechanical assembly 520 having a plurality of possible positions 530 that each correlate to a different amount of tension when the assembly 520 is rotated to permit the tension stem of the solenoid 510 to be inserted into a corresponding one of the possible positions 530. The control unit 210 may define an amount of tension to be applied and the amount of tension determined may be translated to a predetermined position 540 to which the electric motor 350 may operate to move the rotating mechanical assembly 520 of the tension holder 500. After the predetermined position 540 is reached, the stem of the solenoid 510 may be inserted into and continue to maintain the predetermined position 540 as long as the solenoid 510 remains energized. If power is lost or suspended to the mower, the solenoid 510 may be de-energized and a spring or other biasing element against which the solenoid 510 operates may push the stem from the predetermined position 540 so that the tension holder 500 releases tension on the cable winch 150. Accordingly, for example, the stem may be biased to move in the direction indicated by arrow 550 when the solenoid 510 is energized. When power is removed, the solenoid 510 may drop out of position and the stem may be withdrawn in direction 560 by operation of the spring. Meanwhile, rotation of the rotating mechanical assembly 520 in the direction shown by arrow 570 may increase tension on the winch cable 150 and rotation in the direction of arrow 580 may reduce or release tension.

Figure 7:
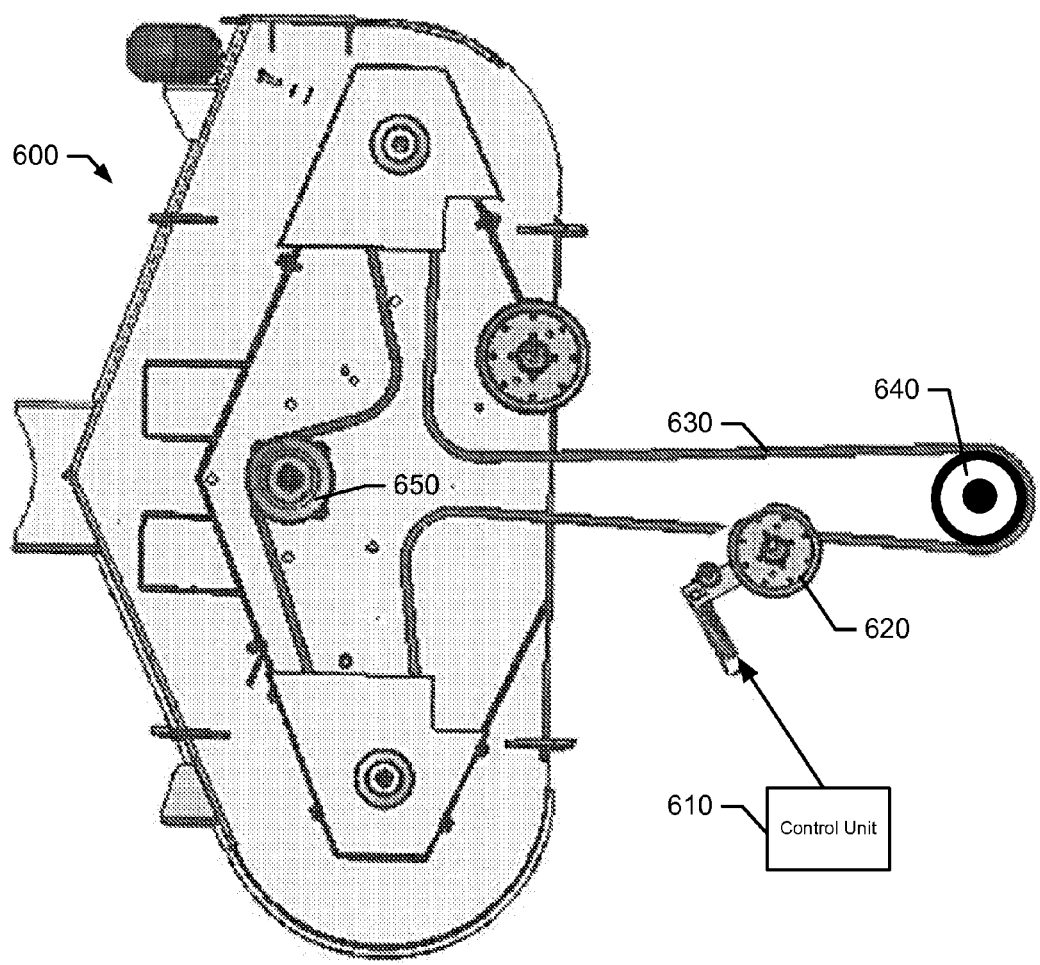
FIG. 7 illustrates an example belt drive system in accordance with an example embodiment.

In the examples described above, tension of the belt drive system may be adjusted in order to control slip to thereby control blade speed under the control of the control unit 210. In other example embodiments, the control unit 210 (e.g., with or without the control over an idler pulley and the use of an electric motor that could be a linear actuator) may act to control blade speed via control of belt tension as a mechanism to alter the pulley ratio. FIG. 7 illustrates an example belt drive system in which a cutting deck 600 is provided for speed control by a control unit 610 (that may be an example of the control unit 210). The control unit 610 may interface with an idler pulley 620 to adjust the tension of a drive belt 630. The drive belt 630 may operably couple a split pulley 640 to at least one blade pulley 650 to turn at least one blade of the cutting deck 600. There may be any desirable number of blades and blade pulleys, and there may also be any number of guide or idler pulleys employed to route the belt in a desired way (not all of which are needed for understanding and therefore not all of which are necessarily shown in FIG. 7).

The split pulley 640 may be configured to change pulley diameter based on the tension of the drive belt 630. Meanwhile, by changing pulley diameter, the pulley ratio between the split pulley 640 and the at least one blade pulley 650 (or driven pulley) may be altered to change the speed of the blade(s) and/or the power transmitted to the blade(s) based on loading conditions. For example, if the load is measured as being high, the microprocessor of the control unit 610 may increase tension on the drive belt 630 to increase the power transmission based on adjustment of the pulley ratio, thereby increasing blade tip speed.

Figure 8:
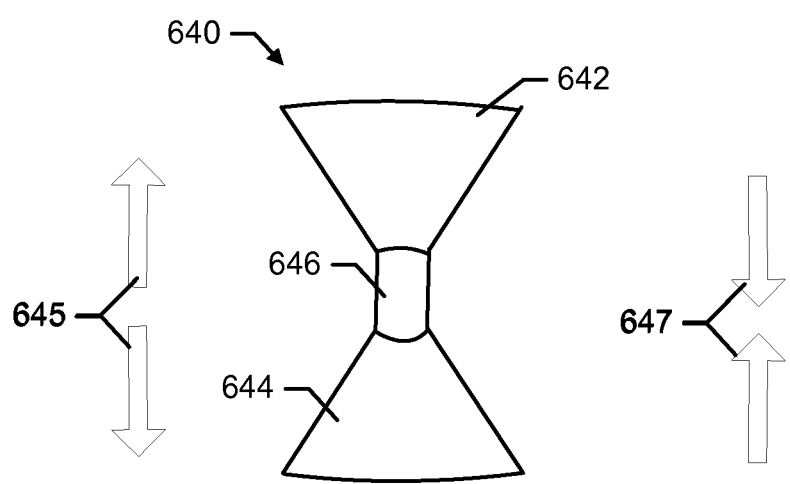
FIG. 8 illustrates a side view of a split pulley usable in the belt drive system of an example embodiment.

FIG. 8 illustrates a side view of the split pulley 640 of an example embodiment. The split pulley 640 may include a first half 642 and a second half 644 that share a same pulley axis 646 of rotation. A biasing member (e.g., a spring) may be provided to bias the first half 642 and second half 644 toward each other. However, as belt tension increases, the force holding the split pulley 640 together may be overcome and the first half 642 and second half 644 may split apart (i.e., moving in the direction of arrows 645) to decrease the effective diameter of the split pulley 640 (and adjust the pulley ratio accordingly). Meanwhile, as belt tension decreases, the biasing member may draw the first half 642 and second half 644 toward each other along the axis 646 (as shown by arrows 647) to increase the effective diameter of the split pulley 640. Accordingly, an increase in drive belt tension may cause the first half 642 and the second half 644 to move away from each other to decrease an effective pulley diameter of the split pulley to change a pulley ratio between the at least one blade pulley 650 and the split pulley 640 to correspondingly change speed of rotation of the at least one blade.

Of note, the control unit 610 may be used in connection with a lawn care vehicle, such as a riding lawn mower, or any other yard maintenance device that employs a PTO. Thus, rather than just enabling the operator to control blade speed, some example embodiments may apply to working assemblies other than cutting decks, when such working assemblies are operated in connection with a PTO. As an example, the working assembly could be an auger assembly of a snow blower or snow thrower. When the PTO is engaged and a drive belt system turns the auger, the load on the auger may be measured and belt tension may be adjusted to keep the auger speed relatively constant. Alternatively or additionally, the load can be measured and belt tension may be adjusted to increase or decrease power delivered to the auger. Although the control unit 610 may operate automatically to achieve certain operational setpoint parameters, some embodiments may additionally or alternatively enable the operator to instruct the processor to adjust belt tension to achieve a desired pulley ratio for certain situations. For example, the operator may select an option for adjusting belt tension to deal with an expected heavy load. As such, for example, the control unit 610 may be set to a heavy duty setting where belt tension will be adjusted to achieve a different setpoint for a pulley ratio than the setpoint used for a normal operation setting.

Further, in some embodiments of the belt drive system, the idler pulley 620 and the split pulley 640 are positioned on the lawn care vehicle but not on the working assembly (e.g., not on the cutting deck 600) of the lawn care vehicle.

For example, the idler pulley 620 may be positioned on the chassis or frame of the lawn care vehicle, and the split pulley 640 may be positioned on the drive shaft operably coupled to the engine of the lawn care vehicle. Such embodiments may be advantageous in that they do not require any of the pulleys on the working assembly to be split pulleys. This means that such embodiments of the belt drive system may be used with any conventional removable or fixed working assembly (e.g., conventional cutting deck, conventional auger, other conventional attachment, etc.), instead of requiring a more-complicated and/or more-expensive working assembly having one or more split pulleys.

Figure 9:
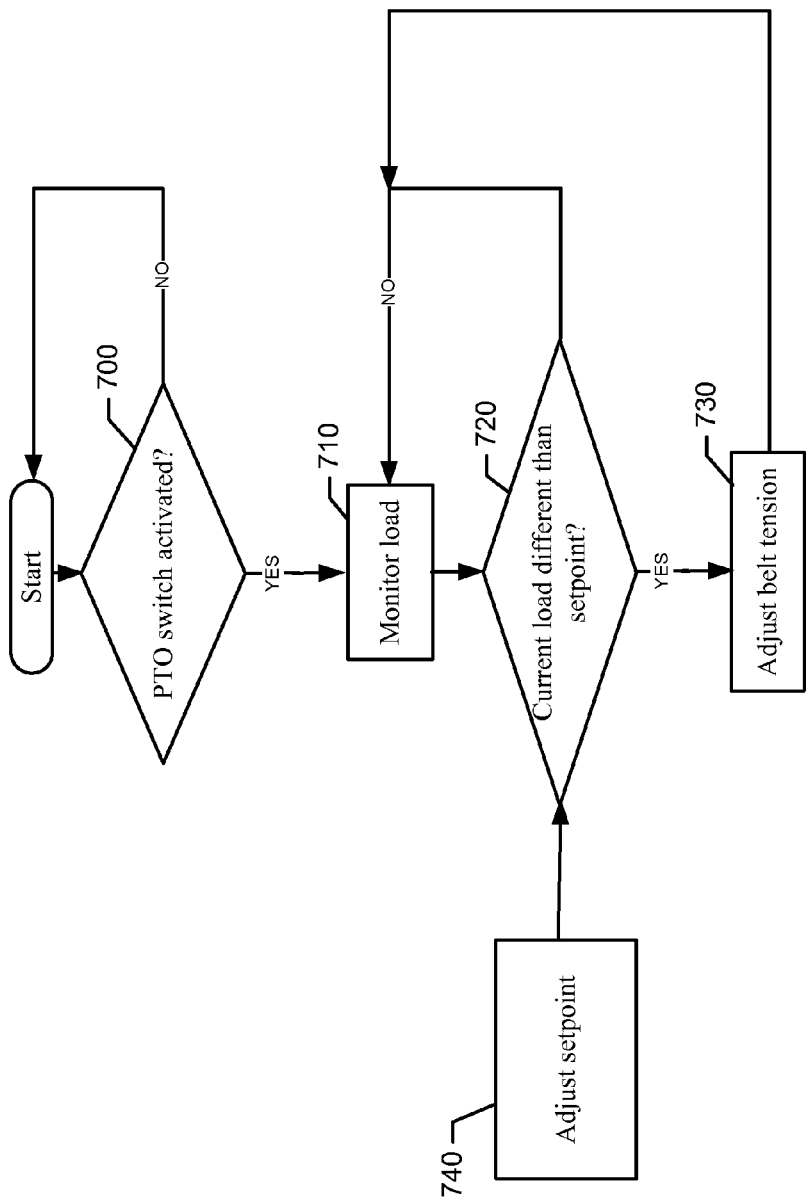
FIG. 9 illustrates a control flow diagram of an example embodiment.

FIG. 9 illustrates a control flow diagram of an example embodiment. In this regard, for example, at operation 700, a determination may be made regarding PTO switch position. If the PTO switch is activated, load measurement of the working assembly (e.g., blade, auger, etc.) may be accomplished at operation 710. The measurement of load may be accomplished by monitoring engine RPM, torque, speed of a component of the working assembly (e.g., blade tip speed, auger RPM, etc.), and/or the like. The load measured may be compared to a setpoint at operation 720. If there is a difference between measured load and the setpoint, then belt tension may be adjusted at operation 730. If there is no difference, then monitoring of load may continue. However, some embodiments may further include a setpoint adjustment option at operation 740, which may change the setpoint (i.e., for heavy, normal, or light duty). When the setpoint is adjusted, the belt tension will normally also be adjusted to achieve the corresponding new setpoint tension.

Accordingly, a lawn care device (or a belt drive system of a yard maintenance vehicle) may be provided in accordance with an example embodiment. The lawn care device may include a cutting deck housing at least one blade, an engine, and a PTO switch. The engine may be configured to selectively provide for rotation of the at least one blade responsive to selective coupling of the rotary power of the engine to the at least one blade. The PTO switch may be operable to engage or disengage a PTO clutch to provide the selective coupling between the engine and the at least one blade via a belt drive system. The belt drive system may include at least one blade pulley operably coupled to the at least one blade, a drive shaft operably coupled to the engine, a drive belt, a tension adjustment assembly, and a control unit. The drive belt may be configured, responsive to engagement of the PTO clutch, to couple the drive shaft to the at least one blade pulley. The tension adjustment assembly may be configured to operably couple to at least one component of the belt drive system to adjust a position thereof to modify tension of the drive belt. The control unit may be configured to provide electronic control of the tension adjustment assembly. In examples involving the belt drive system of a yard maintenance device, the blade and cutting deck may be components of a working assembly. However, the working assembly could alternatively be an auger of a snow blower or snow thrower, or any other rotatable driven component of a device that employs a PTO. In such a case, the working assembly may be turned by rotating a driven pulley (of which the blade pulley may be one example).

The lawn care device or belt drive system of some embodiments may include additional features that may be optionally added alone or in combination with each other. For example, in some embodiments, (1) the control unit may be configured to monitor engine RPM and blade RPM to determine a current slip value. In some example embodiments, (2) the control unit may be configured to perform a comparison of the current slip value to a slip setpoint and control the tension adjustment assembly based on the comparison. In an example embodiment, (3) the control unit may be configured to apply a gradual increase in drive belt tension during a predetermined period of time after activation of the PTO switch. In some cases, (4) the control unit may be configured to apply a pulsed increase in drive belt tension during a predetermined period of time after activation of the PTO switch. In some embodiments, (5) the control unit may be configured to apply a gradual increase in drive belt tension to the slip setpoint. In an example embodiment, (6) the control unit may be configured to apply a pulsed increase in drive belt tension to the slip setpoint. In an example embodiment, (7) the drive shaft includes a split pulley operably coupled to the at least one blade pulley via the drive belt. The split pulley may be configured to change pulley diameter based on the tension of the drive belt. In some cases, (8) the split pulley may include a first half and a second half biased to be drawn toward each other on a pulley axis by a biasing member. In some embodiments, (9) an increase in drive belt tension causes the first half and the second half to move away from each other to decrease an effective pulley diameter of the split pulley to change a pulley ratio between the at least one blade pulley and the split pulley to correspondingly change speed of rotation of the at least one blade.

In some embodiments, any or all of (1) to (9) may be employed in addition to the optional modifications or augmentations described below. For example, in some embodiments, the belt drive system may further include at least one idler pulley that acts as the at least one component. Alternatively or additionally, the tension adjustment assembly may include an electric motor and a winch cable operably coupled to the at least one idler pulley. The electric motor may be operable to increase or decrease tension on the winch cable to adjust a position of the at least one idler pulley. Alternatively or additionally, the electric motor may include a DC electric motor operable to increase or decrease tension on the winch cable to adjust a position of the at least one idler pulley. The DC electric motor may be configured to operate to adjust a tension holder to a predetermined position. The tension holder may be held at the predetermined position by a solenoid such that, responsive to a loss of power, the solenoid releases the tension holder to release tension on the drive belt. Alternatively or additionally, the electric motor may be embodied as a linear actuator. Additionally or alternatively, blade RPM may be detected using an optical sensor configured to detect a drain hole on the at least one blade pulley. In any of the examples above, the lawn care device may be a riding lawn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A lawn care device comprising:
a cutting deck housing at least one blade;
an engine configured to selectively provide for rotation of the at least one blade responsive to selective coupling of the engine to the at least one blade; and
a PTO switch that is operable to engage or disengage a PTO clutch to provide the selective coupling between the engine and the at least one blade via a belt drive system,
wherein the belt drive system comprises:
at least one blade pulley operably coupled to the at least one blade;
a drive shaft operably coupled to the engine;
a drive belt configured, responsive to engagement of the PTO clutch, to couple the drive shaft to the at least one blade pulley;
a tension adjustment assembly configured to operably couple to at least one component of the belt drive system to adjust a position thereof to modify tension of the drive belt; and
a control unit configured to receive an indication of engine RPM and blade RPM to provide electronic control of the tension adjustment assembly to define a slip value to be applied to the drive belt, the slip value being selected based on a comparison between the engine RPM and the blade RPM.

2. The lawn care device of claim 1, wherein the control unit is configured to apply a gradual increase in the tension of the drive belt during a predetermined period of time after activation of the PTO switch.

3. The lawn care device of claim 1, wherein the control unit is configured to apply a pulsed increase in the tension of the drive belt during a predetermined period of time after activation of the PTO switch.

4. The lawn care device of claim 1, wherein the control unit is configured to apply a gradual increase in the tension of the drive belt to a slip setpoint corresponding to the slip value.

5. The lawn care device of claim 1, wherein the control unit is configured to apply a pulsed increase in the tension of the drive belt to a slip setpoint corresponding to the slip value.

6. The lawn care device of claim 1, wherein the drive shaft comprises a split pulley operably coupled to the at least one blade pulley via the drive belt, the split pulley being configured to change pulley diameter based on the tension of the drive belt.

7. The lawn care device of claim 6, wherein the split pulley comprises a first half and a second half biased to be drawn toward each other on a pulley axis by a biasing member.

8. The lawn care device of claim 7, wherein an increase in the tension of the drive belt causes the first half and the second half to move away from each other to decrease an effective pulley diameter of the split pulley to change a pulley ratio between the at least one blade pulley and the split pulley to correspondingly change a speed of rotation of the at least one blade.

9. The lawn care device of claim 1, wherein the belt drive system further comprises at least one idler pulley, and wherein the at least one idler pulley is the at least one component.

10. The lawn care device of claim 9, wherein the tension adjustment assembly comprises an electric motor and a winch cable operably coupled to the at least one idler pulley, the electric motor being operable to increase or decrease tension on the winch cable to adjust a position of the at least one idler pulley.

11. The lawn care device of claim 10, wherein the electric motor comprises a DC electric motor operable to increase or decrease tension on the winch cable to adjust a position of the at least one idler pulley, and wherein the DC electric motor is configured to operate to adjust a tension holder to a predetermined position, the tension holder being held at the predetermined position by a solenoid such that, responsive to a loss of power, the solenoid releases the tension holder to release tension on the drive belt.

12. The lawn care device of claim 10, wherein the electric motor comprises a linear actuator.

13. The lawn care device of claim 1, wherein blade RPM is detected using an optical sensor configured to detect a drain hole on the at least one blade pulley.

14. The lawn care device of claim 1, wherein the lawn care device is a riding lawn mower.

15. A belt drive system for a yard maintenance device having a working assembly selectively rotatable based on engagement or disengagement of a PTO clutch to provide selective coupling between an engine and the working assembly via the belt drive system, the belt drive system comprising:
at least one driven pulley operably coupled to the working assembly;
a drive shaft operably coupled to the engine;
a drive belt configured to selectively couple the drive shaft to the at least one driven pulley;
a tension adjustment assembly configured to operably couple to at least one component of the belt drive system to adjust a position thereof to modify tension of the drive belt; and
a control unit configured to receive an indication of engine RPM and blade RPM to provide electronic control of the tension adjustment assembly to define a slip value to be applied to the drive belt, the slip value being selected based on a comparison between the engine RPM and the blade RPM.

16. The belt drive system of claim 15, wherein the drive shaft comprises a split pulley operably coupled to the at least one driven pulley via the drive belt, the split pulley being configured to change pulley diameter based on the tension of the drive belt.

17. The belt drive system of claim 15, wherein the belt drive system further comprises at least one idler pulley, wherein the at least one idler pulley is the at least one component, and wherein the tension adjustment assembly comprises an electric motor and a winch cable operably coupled to the at least one idler pulley, the electric motor being operable to increase or decrease tension on the winch cable to adjust a position of the at least one idler pulley.

18. The belt drive system of claim 15, wherein the control unit is configured to apply a pulsed increase in the tension of the drive belt during a predetermined period of time after activation of the PTO switch.

19. The belt drive system of claim 15, wherein the control unit is configured to apply a gradual increase in the tension of the drive belt to a slip setpoint corresponding to the slip value.

20. The belt drive system of claim 15, wherein the control unit is configured to apply a pulsed increase in the tension of the drive belt to a slip setpoint corresponding to the slip value.

\* \* \* \* \*